United States Patent
Cecchin

(10) Patent No.: US 11,794,866 B2
(45) Date of Patent: Oct. 24, 2023

(54) BOAT LIFTING GANTRY CRANE

(71) Applicant: CIMOLAI TECHNOLOGY SPA, Carmignano di Brenta (IT)

(72) Inventor: Donato Cecchin, Carmignano di Brenta (IT)

(73) Assignee: CIMOLAI TECHNOLOGY SPA, Carmignano di Brenta (IT)

( * ) Notice: Subject to any disclaimer, the term of this patent is extended or adjusted under 35 U.S.C. 154(b) by 357 days.

(21) Appl. No.: 16/761,035

(22) PCT Filed: Nov. 3, 2017

(86) PCT No.: PCT/IB2017/056867
§ 371 (c)(1),
(2) Date: May 1, 2020

(87) PCT Pub. No.: WO2019/086936
PCT Pub. Date: May 9, 2019

(65) Prior Publication Data
US 2021/0179241 A1  Jun. 17, 2021

(51) Int. Cl.
*B63C 3/06* (2006.01)
*B66C 19/00* (2006.01)
*B60P 3/10* (2006.01)

(52) U.S. Cl.
CPC .............. *B63C 3/06* (2013.01); *B66C 19/005* (2013.01); *B60P 3/1091* (2013.01)

(58) Field of Classification Search
CPC ......... B66C 19/005; B60P 3/1091; B63C 3/06
See application file for complete search history.

(56) References Cited

U.S. PATENT DOCUMENTS

| 4,236,859 | A | * | 12/1980 | Steam | B63C 3/12 |
| | | | | | 254/281 |
| 4,861,218 | A | * | 8/1989 | Lamer | B60P 3/1091 |
| | | | | | 254/281 |
| 4,880,124 | A | * | 11/1989 | Feider | B66C 19/005 |
| | | | | | 212/324 |
| 2006/0180375 | A1 | * | 8/2006 | Wierzba | B66C 9/04 |
| | | | | | 180/253 |

(Continued)

FOREIGN PATENT DOCUMENTS

KR  101685324 B1  12/2016

OTHER PUBLICATIONS

International Search Report dated Jul. 17, 2018 re: Application No. PCT/IB2017/056867, pp. 1-3, citing: US 2015/0125207 A1, KR 10-1685324 B1, US 2009/0045156 A1.

(Continued)

*Primary Examiner* — Kaitlin S Joerger
(74) *Attorney, Agent, or Firm* — CANTOR COLBURN LLP

(57) ABSTRACT

A boat lifting crane includes an upper frame, which in turn has two upper beams, and at least two pairs of carriages. Each carriage of each pair is mounted so that it can move on a respective upper beam and can translate for a respective stroke portion. The boat lifting crane further includes at least one lifting belt, which is extended between two carriages of a same pair of carriages. At least part of the stroke portion of a carriage of a pair of carriages is superimposed on at least part of the stroke portion of a carriage of another pair of carriages.

10 Claims, 6 Drawing Sheets

(56) References Cited

U.S. PATENT DOCUMENTS

| | | | |
|---|---|---|---|
| 2007/0095776 A1* | 5/2007 | Wierzba | B66C 19/005 |
| | | | 212/344 |
| 2009/0045156 A1 | 2/2009 | Wierzba et al. | |
| 2015/0125207 A1 | 5/2015 | Lee | |
| 2015/0203334 A1* | 7/2015 | Moran | B66C 13/22 |
| | | | 212/284 |
| 2019/0225263 A1* | 7/2019 | Cecchin | B62D 7/1509 |

OTHER PUBLICATIONS

Written Opinion dated Jul. 17, 2018 re: Application No. PCT/IB2017/056867, pp. 1-6, citing: US 2015/0125207 A1, KR 10-1685324 B1, US 2009/0045156 A1.

* cited by examiner

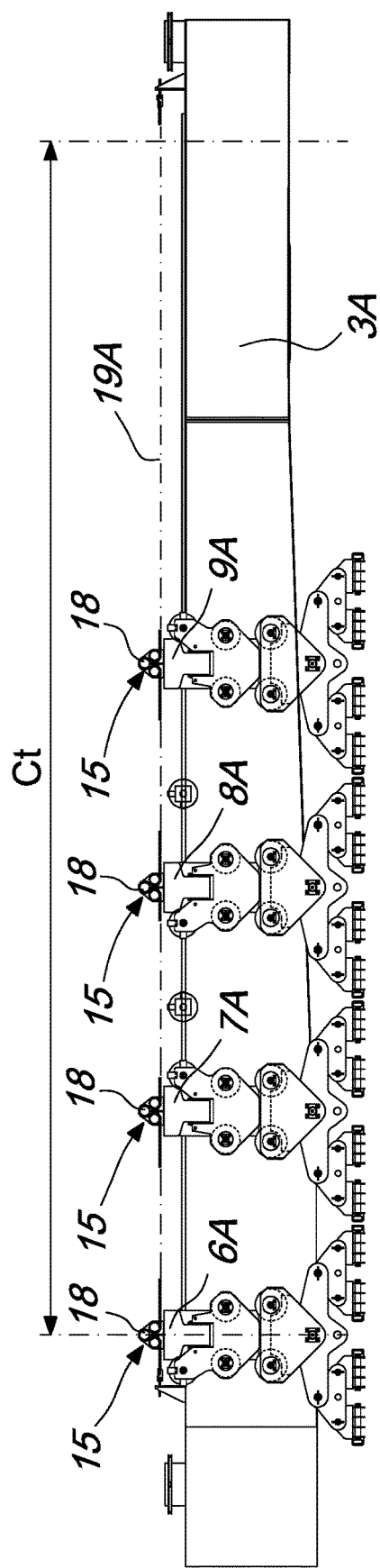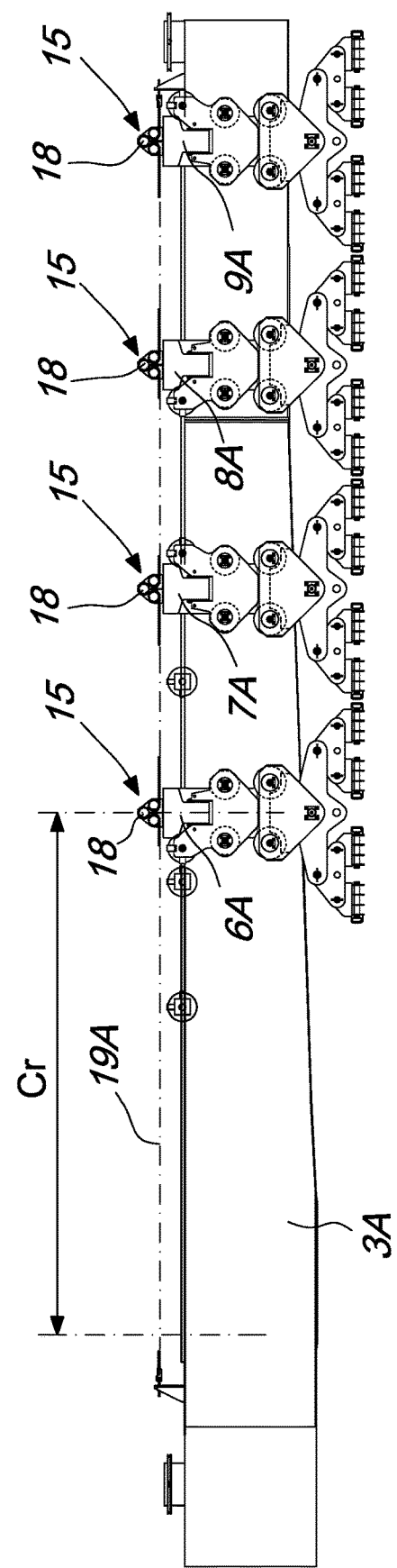

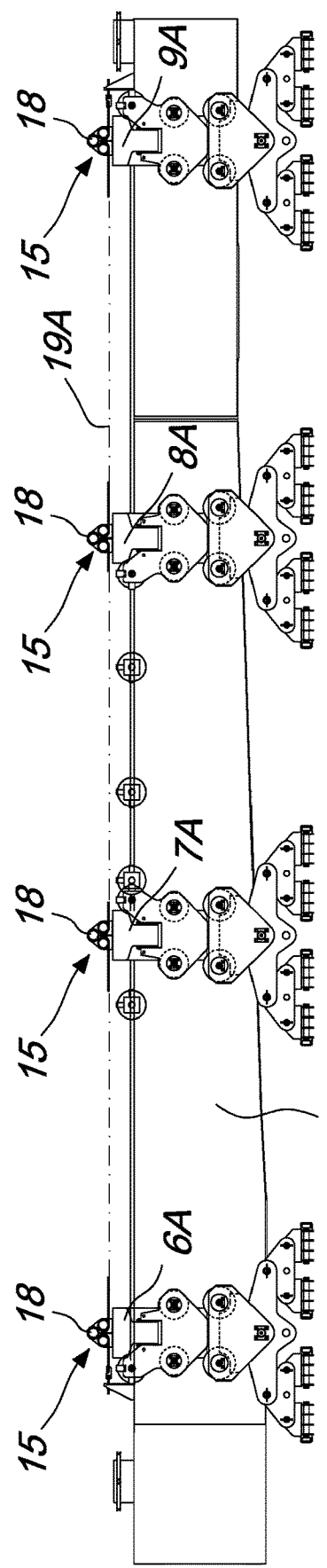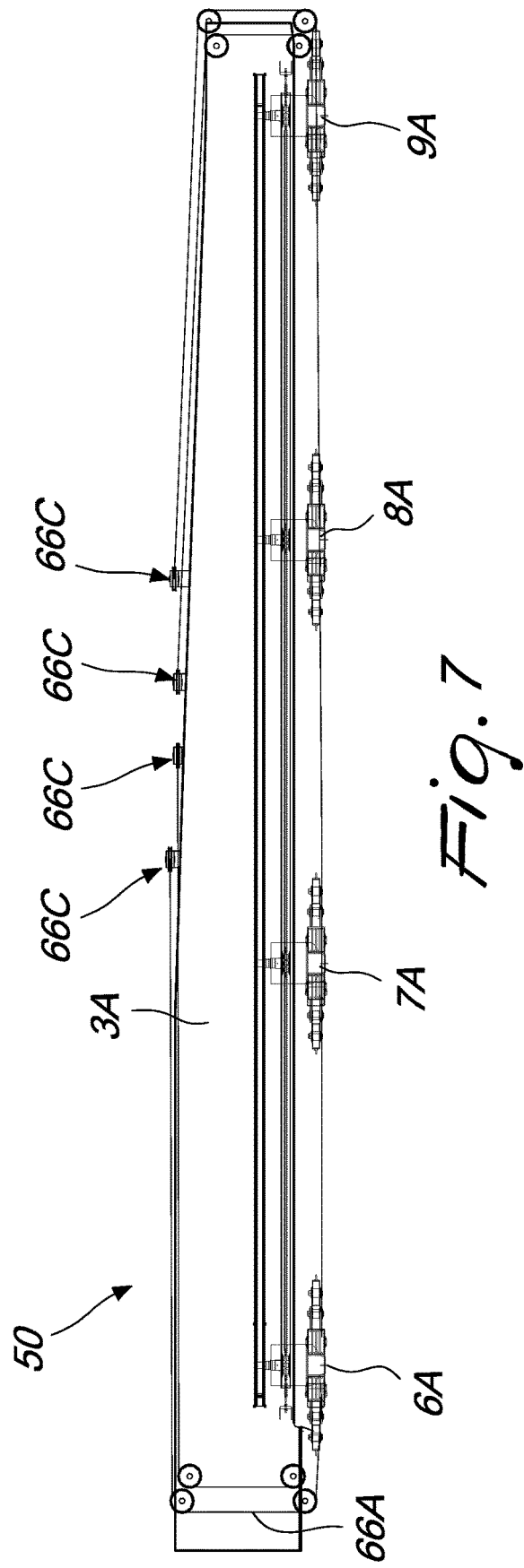

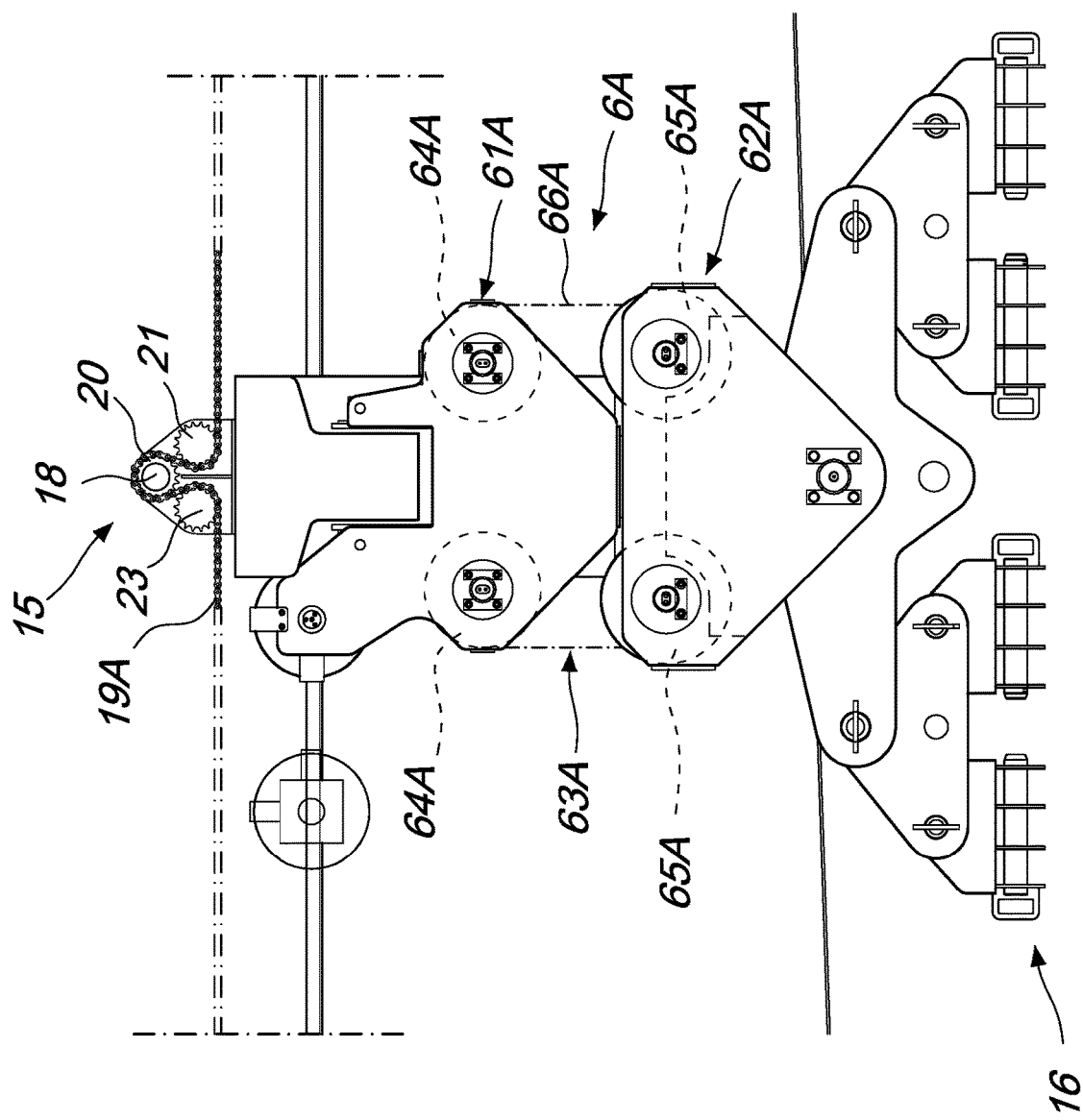

BOAT LIFTING GANTRY CRANE

TECHNICAL FIELD

The present disclosure lies in the field of boat lifting gantry cranes, also identified in the sector as boat lifting portal crane.

BACKGROUND

Boat lifting gantry cranes are large steel structures that as a whole have the shape of a quadrilateral.

These cranes comprise an upper frame and a lower frame: the upper frame comprises two horizontal longitudinal upper beams which are mutually connected by a cross-member, which is also horizontal, arranged at one end of the beams, so as to form a U-shaped upper frame; the lower frame usually has at least four vertical legs, connected to the beams and/or to the cross-member, which are provided with carriages with wheels for resting on the ground. Furthermore, the lower frame can also comprise secondary beams which mutually connect the legs, so as to strengthen the assembly.

The cranes comprise pairs of carriages, between which lifting belts are extended which are adapted to receive the keel of the boat and to support it, thus suspending the boat for its movement and/or maintenance out of the water; for this purpose, each carriage of a same pair is supported by a respective upper beam. The expression "pair of carriages" is used therefore to reference two carriages connected with an opposite end of a same belt.

Each carriage is preferably divided into two parts: an upper base, coupled to the corresponding beam, and a lower portion coupled to the belts: between the upper base and the lower portion there are elements with adjustable extension, which determine the distance between the two parts and ultimately the distance of the belts from the beams; in this manner it is possible to adjust in terms of height the position of a boat supported by the belts.

In conventional solutions, each carriage, and more specifically the upper base of each carriage, can be moved along a portion that is comprised in the respective beam in order to adjust, within certain limits, the position of the belts with respect to the position of the center of gravity of the load, i.e., the boat, so as to better balance the load on said belts.

For this purpose, a dedicated actuation means is associated with each carriage and allows its movement along the beam for a certain limited stroke.

One limitation that is common to conventional cranes as described above is linked to the fact that they have a partially limited versatility in use. The dimensions of the boat crane and the arrangement of the lifting belts are in fact closely connected to the type of boat to be lifted. On the one hand, in fact, a boat that is significantly shorter than the length of the beams of the upper frame of the crane can be difficult to hang correctly on the belts thereof, due to the incorrect and excessively tilted position that the belts would assume in order to try to wrap around the hull.

Another limitation is linked to the lifting of boats the centers of gravity of which are not compatible with the geometries of the crane and/or with the positions that the lifting carriages can assume: the limited allowed movement of the carriages of known cranes might be insufficient to balance the load on the belts, with the consequence that the belts might be loaded unevenly.

SUMMARY

The aim of the present disclosure is to provide a boat lifting gantry crane that solves the problems of the background art, overcoming the drawbacks and limitations of the background art described above and thus allowing to lift in the best possible way boats that have dimensions and weights that are even significantly mutually different.

Within this aim, the present disclosure provides a crane that is more versatile in use.

The disclosure also provides a crane that is capable of balancing the loads on the belts in a particularly effective manner.

The disclosure further provides a crane that is capable of giving the greatest assurances of reliability and safety in use.

This aim and these and other advantages which will become better apparent hereinafter are achieved by providing a boat lifting crane, comprising:
- an upper frame, which in turn comprises two upper beams,
- at least two pairs of carriages, each carriage of each pair being mounted so that it can move on a respective upper beam and can translate for a respective stroke portion,
- at least one lifting belt, which is extended between two carriages of a same pair of carriages,
- wherein at least part of the stroke portion of a carriage of a pair of carriages is superimposed on at least part of the stroke portion of a carriage of another pair of carriages.

In this manner, the carriages can be moved so as to assume different positions along the upper beam; this allows to improve the versatility of the crane, which can therefore be used to lift boats having different lengths and different weight distributions.

The free movement of the carriages along the beams also allows to optimize the load that acts on the crane. The carriages can in fact assume the optimum positions, depending on the position of the center of gravity of the load or of the boat to be lifted, at which a balanced distribution of the force discharged onto the belts of the carriages is obtained, with a beneficial result in terms of both load distribution and load balance.

Each carriage is preferably provided with a device for detecting the position and/or load supported by the individual carriage, preferably of the relative position on the respective cross-member; these devices for detecting position and/or load are functionally connected to a control unit in order to control the position and/or load of the carriage.

The control unit can also comprise an actuation unit, which is functionally connected to each drive unit of the individual carriage, so as to actuate its movement along the respective cross-member in order to adapt the distribution of the load and the balance thereof; preferably, these functionalities are performed at least partly by the control unit automatically.

BRIEF DESCRIPTION OF THE DRAWINGS

Further characteristics and advantages will become better apparent from the description of a preferred but not exclusive embodiment of a boat lifting gantry crane, illustrated by way of nonlimiting example with the aid of the accompanying drawings, wherein:

FIGS. 4-6 are side views of a beam of the crane of the preceding figures with the carriages in different operating positions;

FIG. 7 is a top view of part of an adjustment system provided on the crane of FIGS. 1-3; and FIG. 8 is a side view of a carriage of the crane of the preceding figures.

DETAILED DESCRIPTION OF THE DRAWINGS

Figure 1:
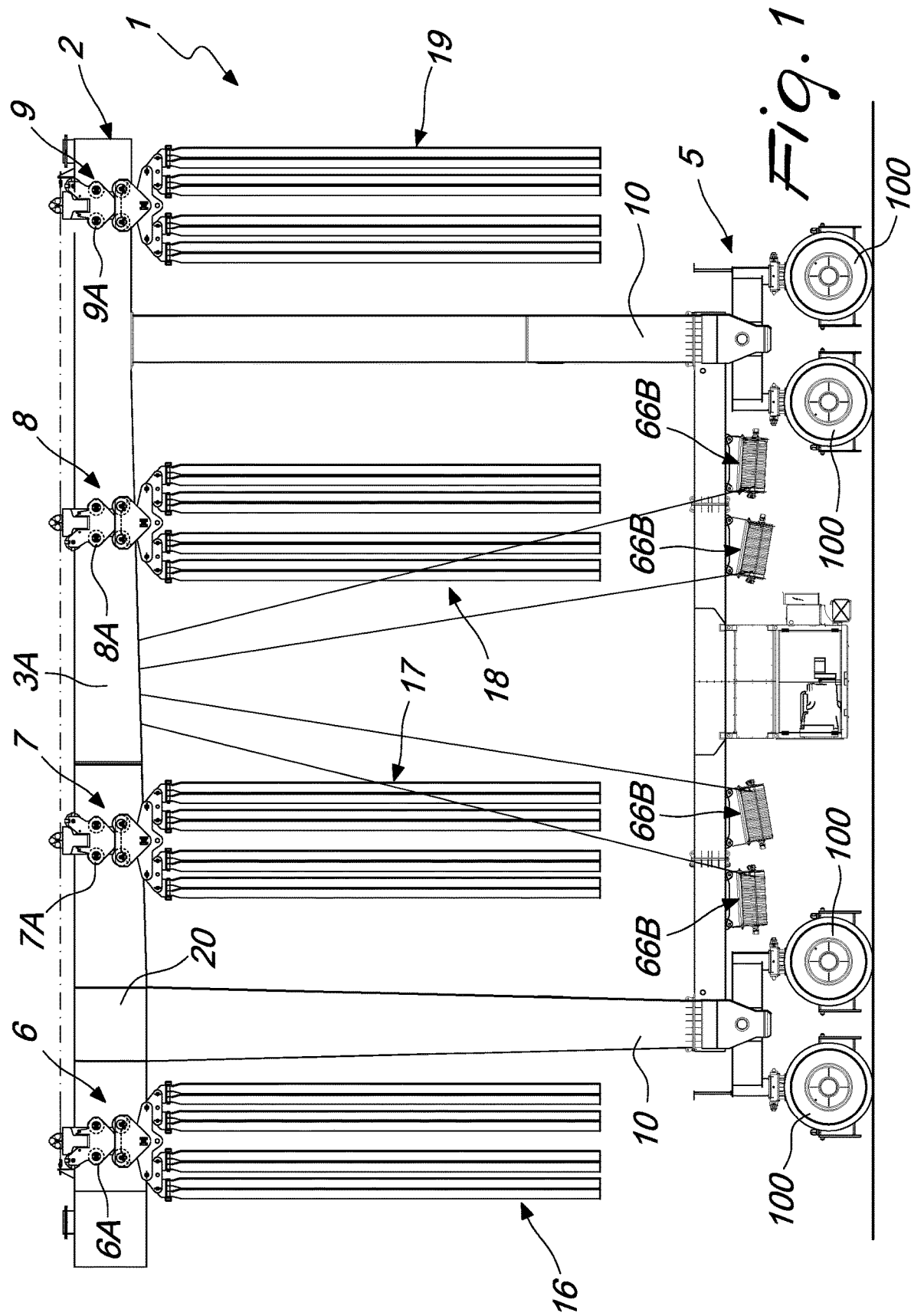
FIG. 1 is a side view of an embodiment of a boat lifting gantry crane according to the disclosure, taken along the sectional plane AA of FIG. 2.

With reference to the cited figures, the crane for boats, preferably a boat lifting gantry crane, generally designated by the reference numeral 1, comprises an upper frame 2, which in turn comprises two upper beams 3A, 3B.

The upper beams 3A, 3B are arranged parallel to each other and substantially horizontally in the condition in which the crane 1 is operational.

Owing to the great load that the beams 3A and 3B must withstand in operation, the beams are preferably provided by means of steel structures.

On the beams there are, in the illustrated nonlimiting example, four pairs of carriages 6, 7, 8, 9; it is noted right now that generally speaking the pairs of carriages may also be two, three or more than four.

Each carriage 6A, 6B; 7A, 7B; 8A, 8B; 9A, 9B of each pair 6, 7, 8, 9 is mounted so that it can move on a respective upper beam 3A, 3B and can translate for a respective stroke portion, so that each pair of carriages 6, 7, 8, 9 has a carriage 6A, 7A, 8A, 9A on one beam and the other carriage 6B, 7B, 8B, 9B on the other beam.

At least one lifting belt 16, 17, 18, 19 is extended between the two carriages 6A, 6B; 7A, 7B; 8A, 8B; 9A, 9B of a same pair 6, 7, 8, 9; in the preferred embodiment, for each pair of carriages 6, 7, 8, 9, there are four lifting belts, but more generally their number varies according to the requirements.

According to the disclosure, at least part of the stroke portion (Cr) of a carriage 6A, 6B; 7A, 7B; 8A, 8B; 9A, 9B of a pair of carriages is superimposed on at least part of the stroke portion of a carriage 6A, 6B; 7A, 7B; 8A, 8B; 9A, 9B of another pair 6, 7, 8, 9 of carriages.

This allows the individual carriages 6A, 6B; 7A, 7B; 8A, 8B; 9A, 9B to move in a relatively free manner substantially along the entire longitudinal extension, or in any case along a long portion thereof, of the respective cross-member 3A, 3B, and thus allows to arrange the lifting belts 16, 17, 18, 19 at variable distances, both in a relative sense with respect to each other and with respect to one of the free ends of the cross-members 3A, 3B.

It should be noted, with reference to FIG. 4, that— theoretically, if no other carriages were present—each carriage (for example 6A) could move freely along a theoretical stroke (Ct) which substantially coincides with the entire longitudinal length of the respective beam 3A, 3B; in reality, the actual stroke (Cr) of the individual carriage 6A, 6B; 7A, 7B; 8A, 8B; 9A, 9B is limited by two stroke limit positions that are defined by the space occupation of the other carriages that are present on the respective beam 3A, 3B and by the length of said beam 3A, 3B and/or, as in the illustrated example, by the ends of the reaction element 19A, which will be described in greater detail hereinafter.

This ensures high versatility in use, since the crane 1 can suspend boats which have lengths that are even significantly mutually different and at the same time allows to balance the load.

For example, in order to suspend very short boats, it is sufficient to move the carriages mutually closer, reducing the overall distance between the belts, or, if there is a boat with a center of gravity that is shifted toward one end of the beams, it is sufficient to move the carriages so as to support the load in a balanced manner, for example by providing the placement of most of the carriages close to the center of gravity, so as to distribute the weight of the boat on a plurality of belts.

Figure 2:
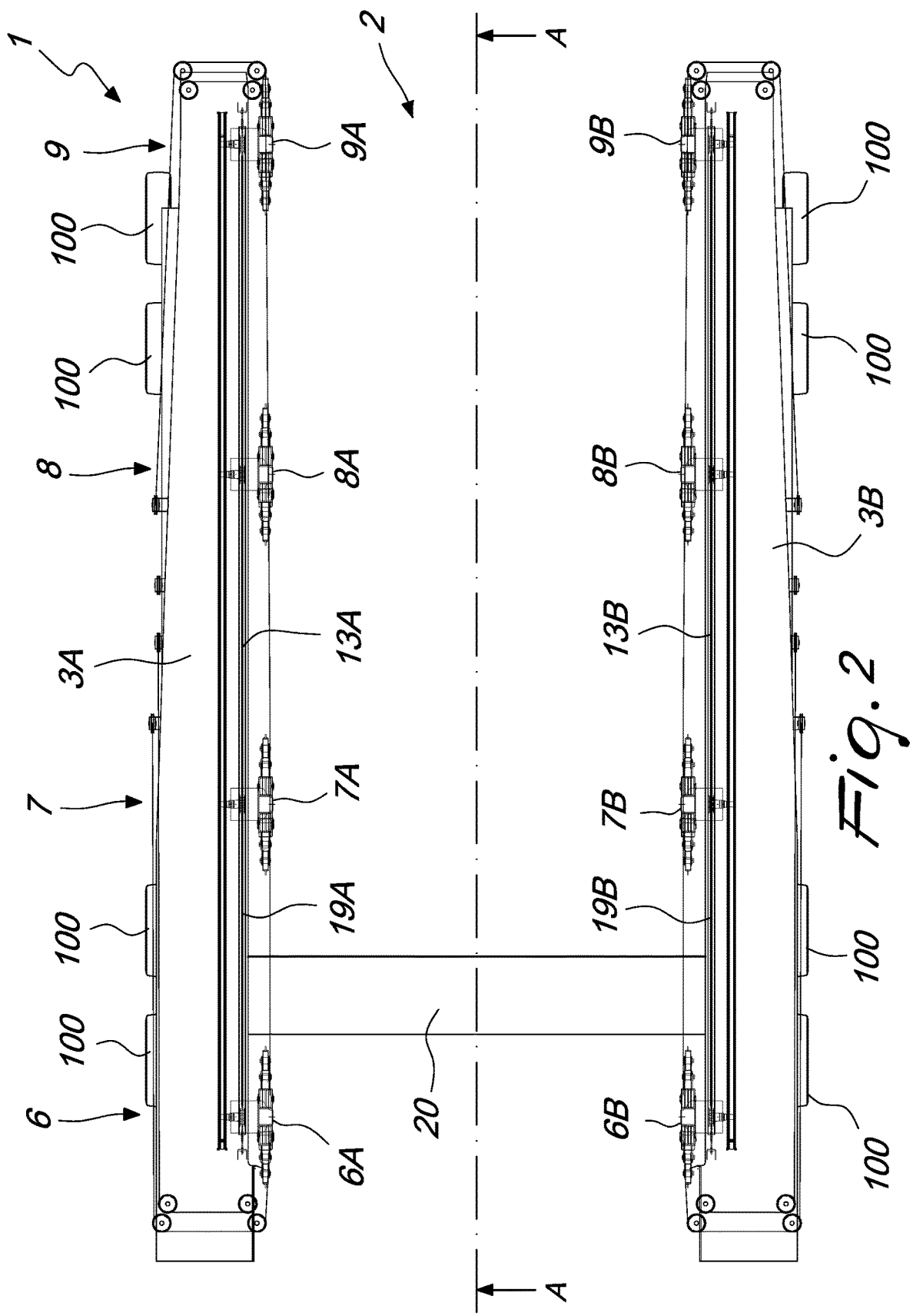
FIG. 2 is a top plan view of the crane of the preceding figure.
Figure 3:
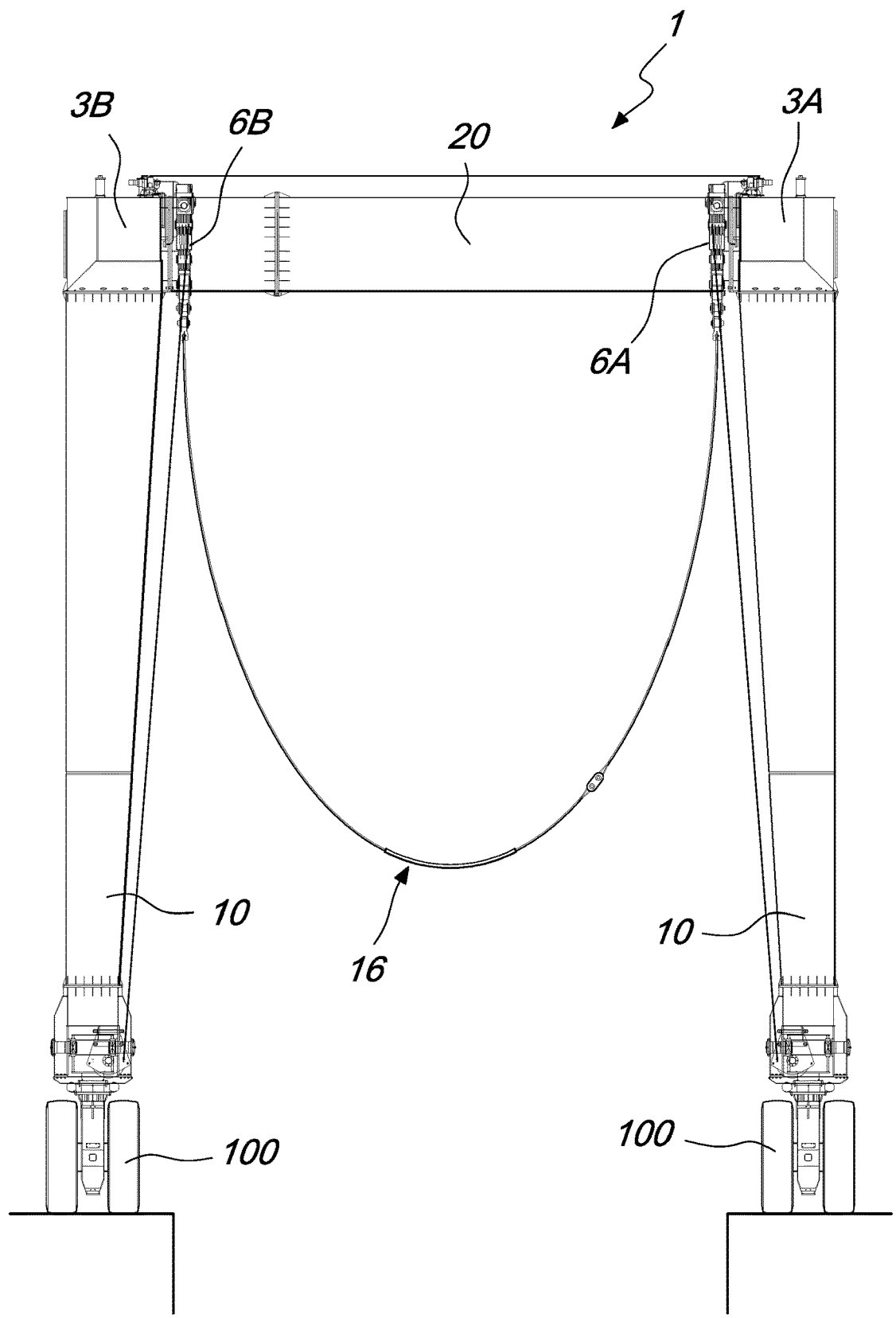
FIG. 3 is a front view of the crane of FIGS. 1 and 2.

Going back to FIGS. 1-3, in the preferred and illustrated embodiment the beams 3A, 3B of the upper frame 2 are connected by a cross-member 20 which is coupled to the beams 3A, 3B at an end portion thereof; whereas in other embodiments the cross-member can be arranged along the beams 3A, 3B in a position that is different from the one shown in FIGS. 1-3, for example in a central position.

In yet other embodiments, in addition to the beam 20 there can be further additional cross-members for connecting the beams 3A, 3B.

In the preferred and illustrated embodiment, the crane 1 comprises, in addition to the upper frame 2, also a lower supporting frame 5 which comprises vertical legs 10 and is connected to the upper frame 2.

The lower frame, if present, is optionally provided with wheels 100 which are connected to the legs 10, so as to render the crane 1 self-propelled.

In some embodiments, not shown, the lower frame 2 might be provided by means of fixed walls made of masonry which perform the role of the lower frame 5 and on which the beams 3A, 3B rest.

It is possible to connect actuation motors to the wheels 100 of the lower frame, if they are present. Some or all the wheels may be steerable, so as to render the crane movable along preferred trajectories, for example to move the boat easily into a dock where boat repair or restoration work is to be performed.

With reference to the preferred and illustrated embodiment, the translational motion of the individual carriage 6A, 6B; 7A, 7B; 8A, 8B; 9A, 9B in its stroke along the respective beam 3A, 3B is allowed by at least one translation means (preferably a wheel, a slider, a sliding block or the like and optionally a combination thereof) provided on each carriage.

Preferably, the movement of the carriages is allowed and occurs only without the load: the purpose is to arrange the lifting belts in order to lift the load in the best way.

Correspondingly, each beam 3A, 3B comprises a translation support 13A, 13B that is designed to support, in a manner that allows translation (by rolling or sliding), each carriage by cooperating with the respective translation means (the wheel or the slider or the sliding block thereof); said translation support 13A, 13B is preferably common for all carriages 6A, 7A, 8A, 9A; 6B, 7B, 8B, 9B of the same beam 3A; 3B, which therefore all move on the same translation support 13A; 13B. For example, the support might be a rail or a track or a sliding plate and the wheel might be shaped so as to engage it or might be a resting or contact surface on which the slider or sliding block slides.

An actuation device 15 is provided in order to cause the movement of the individual carriages 6A, 7A, 8A, 9A; 6B, 7B, 8B, 9B in their stroke along the beam 3A, 3B; said device can be (alternately or in combination) accommodated on board each carriage and/or on the frame.

In the preferred and illustrated solution, the actuation device 15 comprises a drive unit 18 on board each carriage 6A, 6B; 7A, 7B; 8A, 8B; 9A, 9B and at least one reaction element 19A, 19B for each beam 3A, 3B.

The reaction element 19A, 19B is fixed, coupled to the respective beam 3A, 3B, and cooperates with the drive unit 18 of each carriage 6A, 6B; 7A, 7B; 8A, 8B; 9A, 9B in order to cause the movement of the latter along the respective stroke.

Although this solution is apparently expensive (in fact it provides a drive unit 18 on board each carriage), it has however the advantage of ensuring independent movement of the individual carriages 6A, 6B; 7A, 7B; 8A, 8B; 9A, 9B, which can be moved autonomously; this allows to orient the belts even in a manner which is not perfectly perpendicular to the beams 3A, 3B, for example if the load (boat) has a center of gravity that is displaced with respect to the longitudinal central centerline plane of the crane 1.

Each drive unit 18 comprises an engagement element 20 which is connected to a driving shaft of a dedicated motor (for example an electric or hydraulic motor); in order to allow effective and precise movement of the carriages, preferably the reaction element 19A, 19B and the engagement element 20 are arranged to be coupled so that they can move with respect to each other by shape interference coupling.

In the preferred and illustrated embodiment, the reaction element 19A, 19B is a chain and the engagement element 20 is a pinion designed to mesh with said chain.

Furthermore, in this embodiment there are two driven pinions 21 and 23, which are designed to keep the chain meshed on the pinion; for this purpose, the driven pinions 21 and 23 are arranged at a different height with respect to the pinion that is connected to the driving shaft, so that the chain performs approximately at least half a turn around the latter (preferably more than half a turn, as in FIG. 8), thus being stably meshed on the pinion 20 that is motorized by the motor 18.

The chain (or more generally the reaction element) is fixed with respect to the respective beam 3A, 3B and preferably is extended substantially along the entire length of the latter.

In an alternative embodiment, not shown, instead of the chain and the pinion connected to the shaft of the motor on board each carriage there are respectively a rack and a sprocket configured to mesh with the rack.

In an alternative embodiment, not shown, the assembly for actuating translation, of the chain type or of another type, can be installed in the fixed part at the ends of the upper beams 3A and 3B.

Moving on now to analyze in greater detail the carriages 6A, 6B; 7A, 7B; 8A, 8B; 9A, 9B provided on the crane 1, reference should be made to FIG. 8, which shows a carriage 6A, the other carriages being substantially identical.

The carriage 6A comprises an upper base 61A, which is coupled to the respective beam 3A, and a lower portion 62A, which is coupled to the respective lifting belt 16.

The upper base 61A and the lower portion 62A are coupled adjustably by virtue of coupling elements with adjustable extension 63A, so that the distance between the upper base 61A and the lower portion 62A is adjustable: this ultimately causes the adjustment of the belts and therefore the lifting of the load suspended by them.

Preferably, the coupling elements with adjustable extension 63A comprise:
  a first pulley assembly 64A, associated with the upper base 61A
  a second pulley assembly 65A, associated with the lower portion 62A
  a cable 66A which is engaged by the pulley elements 64A, 65A.

In the preferred embodiment shown, each pulley assembly 64A and 65A comprises a pair of individual pulleys, but there might be also a single pulley or three or more, as needed.

In this manner, the lower portion 62A can be moved vertically and suspended with respect to the upper base 61A by means of the cable 66A.

In order to move the lower portion 62A, the crane 1 comprises an adjustment system 50 which is designed to act on said cable 66A of each carriage, so as to vary its length and therefore vary the distance of the lower portion 62A from the base 61A.

Preferably, the adjustment system 50 comprises first guiding pulleys 66C and a motorized winch 66B for winding the cable 66A.

In greater detail, preferably for each carriage there is a respective cable 66A which is guided from the first guiding pulleys 66C arranged on the respective beam to the motorized winch 66B arranged in the lower part of the crane.

The operation of the crane is clear and evident from what has been described.

In practice it has been found that the crane according to the present disclosure achieves the intended aim and objects, since it allows to render the crane more versatile, making it capable of lifting boats of even very different dimensions without this entailing an imbalance of the load or unsafe lifting.

Another advantage of the crane according to the disclosure relates to the possibility to balance the loads in an optimum manner.

The crane thus conceived is susceptible of numerous modifications and variations, all of which are within the scope of the appended claims.

All the details may furthermore be replaced with other technically equivalent elements.

In practice, the materials used, so long as they are compatible with the specific use, as well as the contingent shapes and dimensions, may be any according to the requirements.

The invention claimed is:
1. A boat lifting crane comprising:
  an upper frame having two upper beams,
  at least two pairs of carriages, each carriage of each pair being mounted so that each carriage is configured to move on a respective upper beam and is configured to translate for a respective stroke portion,
  at least one lifting belt extended between two carriages of a same pair of carriages,
  wherein at least part of the stroke portion of a carriage of one of the pairs of carriages is superimposed on at least part of the stroke portion of a carriage of the other of the pairs of carriages, the stroke of each carriage of the pairs of carriages being only limited by two stroke limit positions that are defined by space occupation of other carriages disposed on the respective upper beam also in an operative condition, wherein each of the carriages comprises an upper base coupled to the respective upper beam, and a lower portion coupled to the respective lifting belt, each carriage being further provided with coupling elements with adjustable extension configured to adjustably couple the upper base to the lower portion, wherein the coupling elements comprise:
    a first pulley assembly associated with the upper base;
    a second pulley assembly associated with the lower portion; and
    a cable engaged by the first and second pulley assemblies, and further comprising an adjustment system configured to act on said cable of the coupling elements with adjustable extension of each carriage, said adjustment system comprising, for each carriage, first guiding pulleys and a motorized winch for winding the cable, the adjustment system being configured to vary a length of the cable and therefore vary a distance of the lower portion from the upper base.

2. The crane according to claim 1, wherein each carriage comprises at least one translation means and each upper beam comprises a translation support which cooperates with the translation means, said translation support being common for all the translation means of the carriages of the same upper beam.

3. The crane according to claim 1, further comprising an actuation device configured to cause the movement of at least one carriage of said at least two pairs of carriages along the respective stroke.

4. The crane according to claim 3, wherein the actuation device comprises:
 a drive unit on board each carriage;
 for each beam, at least one fixed reaction element coupled to the respective upper beam, which cooperates with the drive unit of each carriage to determine the movement of the latter along the respective stroke.

5. The crane according to claim 4, wherein each drive unit comprises an engagement element, the fixed reaction element and the engagement element being arranged so that the fixed reaction element and the engagement element are coupled and configured to move with respect to each other by shape interference.

6. The crane according to claim 5, wherein the fixed reaction element is a chain and the engagement element is a pinion configured to mesh with said chain.

7. The crane according to claim 5, wherein the fixed reaction element is a rack and the engagement element is a sprocket configured to mesh with said rack.

8. The crane according to claim 1, wherein the upper beams of the upper frame are connected by a cross-member coupled to the upper beams at an end portion of the upper beams.

9. The crane according to claim 1, further comprising a lower supporting frame having vertical legs and being connected to the upper frame.

10. The crane according to claim 9, wherein the vertical legs have wheels.

* * * * *